US012449522B2

(12) United States Patent
Hanawa et al.

(10) Patent No.: US 12,449,522 B2
(45) Date of Patent: Oct. 21, 2025

(54) ULTRASONIC TRANSDUCER

(71) Applicant: Niterra Co., Ltd., Nagoya (JP)

(72) Inventors: Yuichiro Hanawa, Nagoya (JP); Asuka Tsujii, Nagoya (JP); Ryo Suzuki, Nagoya (JP); Shinsuke Itoh, Nagoya (JP); Takashi Kasashima, Nagoya (JP); Toshihito Sonobe, Nagoya (JP); Hirotoshi Yoshizaki, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 0 days.

(21) Appl. No.: 18/271,553

(22) PCT Filed: Aug. 9, 2022

(86) PCT No.: PCT/JP2022/030395
§ 371 (c)(1),
(2) Date: Jul. 10, 2023

(87) PCT Pub. No.: WO2023/022067
PCT Pub. Date: Feb. 23, 2023

(65) Prior Publication Data

US 2024/0310497 A1 Sep. 19, 2024

(30) Foreign Application Priority Data

Aug. 20, 2021 (JP) ................................ 2021-134553

(51) Int. Cl.
*G01S 7/521* (2006.01)

(52) U.S. Cl.
CPC .................................. *G01S 7/521* (2013.01)

(58) Field of Classification Search
CPC .... B06B 1/0625; B06B 2201/76; G01S 7/521
See application file for complete search history.

(56) References Cited

U.S. PATENT DOCUMENTS 7,052,464 B2 * 5/2006 Wodnicki .............. B06B 1/0292 29/25.35
7,625,073 B2 * 12/2009 Kitakami ............ B41J 2/14233 347/68

(Continued)

FOREIGN PATENT DOCUMENTS

DE 4142372 A1 6/1993
JP 2002-359896 A 12/2002

(Continued)

OTHER PUBLICATIONS

International Search Report for PCT/JP2022/030395 dated Sep. 13, 2022.

(Continued)

*Primary Examiner* — Daniel L Murphy
*Assistant Examiner* — Amie M Ndure
(74) *Attorney, Agent, or Firm* — Sughrue Mion, PLLC

(57) ABSTRACT

An ultrasonic transducer (1) including: a plurality of vibrators (11); and a connection portion (30) connecting the vibrators (11) to each other. Each of the vibrators (11) has a piezoelectric element (21) and a vibration plate (20) joined to the piezoelectric element (21). The connection portion (30) connects the vibration plates (20) to each other. A width (W2) of the connection portion (30) is smaller than a width (W1) of the vibration plate (20). In this configuration, the relative positional relationship among the vibrators (11) is easily stabilized.

11 Claims, 6 Drawing Sheets

(56) References Cited

U.S. PATENT DOCUMENTS

| | | | | |
|---|---|---|---|---|
| 7,732,987 | B2 | 6/2010 | Gao et al. | |
| 8,033,653 | B2 * | 10/2011 | Kitakami | B41J 2/14233 347/68 |
| 8,104,876 | B2 * | 1/2012 | Sekiguchi | B41J 2/14233 347/70 |
| 9,456,803 | B2 | 10/2016 | Nakamura et al. | |
| 10,985,637 | B2 * | 4/2021 | Honda | H02K 15/022 |
| 11,418,134 | B2 * | 8/2022 | Ninomiya | H02N 2/026 |
| 2003/0102777 | A1 * | 6/2003 | Kuniyasu | B06B 1/0629 310/334 |
| 2004/0104975 | A1 * | 6/2004 | Furuhata | B41J 2/14233 347/68 |
| 2004/0210289 | A1 * | 10/2004 | Wang | A61K 9/5094 607/116 |
| 2005/0012785 | A1 * | 1/2005 | Furuhata | B41J 2/1632 347/68 |
| 2005/0140248 | A1 * | 6/2005 | Kuniyasu | B06B 1/0629 310/334 |
| 2008/0290757 | A1 * | 11/2008 | Gao | B06B 1/0622 29/25.35 |
| 2009/0256445 | A1 * | 10/2009 | Kotani | H02N 2/103 310/323.16 |
| 2013/0338508 | A1 | 12/2013 | Nakamura et al. | |
| 2014/0063130 | A1 * | 3/2014 | Arai | B41J 2/1433 29/25.35 |
| 2016/0007963 | A1 | 1/2016 | Nakamura et al. | |

FOREIGN PATENT DOCUMENTS

| | | | | |
|---|---|---|---|---|
| JP | 2009-10940 | A | 1/2009 | |
| JP | 2012-34019 | A | 2/2012 | |
| JP | 2013-175935 | A | 9/2013 | |
| JP | 6173938 | B2 * | 8/2017 | |
| JP | 2017225013 | A * | 12/2017 | |
| JP | 2024141332 | A * | 10/2024 | A61B 8/4444 |

OTHER PUBLICATIONS

Extended European Search Report issued May 9, 2025 in Application No. 22858388.6.

Communication dated Aug. 27, 2025 in Japanese Application No. 2021-134553.

* cited by examiner

ULTRASONIC TRANSDUCER

CROSS REFERENCE TO RELATED APPLICATIONS

This application is a National Stage of International Application No. PCT/JP2022/030395 filed Aug. 9, 2022, claiming priority based on Japanese Patent Application No. 2021-134553 filed Aug. 20, 2021.

TECHNICAL FIELD

The present invention relates to an ultrasonic transducer.

BACKGROUND ART

Patent Document 1 discloses a parametric speaker. The parametric speaker includes a substrate and a plurality of ultrasonic sounding bodies (vibrators). The ultrasonic sounding bodies (vibrators) are individually disposed on the substrate.

PRIOR ART DOCUMENT

Patent Document

Patent Document 1: Japanese Patent Application Laid-Open (kokai) No. 2013-175935

SUMMARY OF THE INVENTION

Problem to be Solved by the Invention

In a configuration in which multiple vibrators are individually disposed on a substrate as in Patent Document 1, it is difficult to stabilize the relative positional relationship among the vibrators.

An object of the present invention is to provide a technology in which the relative positional relationship among vibrators is easily stabilized.

Means for Solving the Problem

[1] An ultrasonic transducer in the present invention includes: a plurality of vibrators; and a connection portion connecting the vibrators to each other. Each of the vibrators has a piezoelectric element and a vibration plate joined to the piezoelectric element. The connection portion connects the vibration plates to each other. A width of the connection portion is smaller than a width of the vibration plate.

In this configuration, the vibrators are connected to each other by the connection portion, and thus the relative positional relationship among the vibrators is easily stabilized. Moreover, the vibrators are connected to each other by connecting the vibration plates as parts of the vibrators, and the width of the connection portion connecting the vibration plates to each other is smaller than the width of the vibration plate. Consequently, transmission of vibration between the vibration plates through the connection portions can be suppressed.

[2] The vibration plate may have a cut portion formed by cutting the vibration plate from an outer circumferential edge thereof to an inner side thereof, the connection portion may be connected to a part of an inner surface of the cut portion, and a recessed portion opened to an outer circumferential side of the vibration plate may be formed between the connection portion and the inner surface of the cut portion.

When the vibration plate is vibrated, an annular node is formed on the vibration plate, and vibration become more intense from the node toward the outer circumferential side. Thus, if the connection portion is connected to the outer circumferential edge of the vibration plate, intense vibration at the outer circumferential edge is transmitted to the connection portion. Meanwhile, in the above configuration, the connection portion is connected to a part of the inner surface of the cut portion formed by cutting the vibration plate from the outer circumferential edge thereof to the inner side thereof, and the recessed portion opened to the outer circumferential side of the vibration plate is formed between the connection portion and the inner surface of the cut portion. Consequently, direct transmission of intense vibration at the outer circumferential edge to the connection portion can be avoided. Therefore, transmission of vibration between the vibration plates through the connection portions can be further suppressed.

[3] The ultrasonic transducer may further include: a base portion; and a plurality of interposed members. Each of the interposed members may have an annular shape, may be disposed between a corresponding one of the vibrators and the base portion, and may be joined to the vibrator and the base portion. The recessed portion may have a bottom located between an inscribed circle inscribed in the interposed member and a circumcircle circumscribing the interposed member in a planar direction orthogonal to a thickness direction of the vibration plate.

The vibrator is joined to the base portion with the interposed member therebetween, and therefore, a portion, of the vibrator, to which the interposed member is joined is less likely to be vibrated. In the above configuration, the recessed portion has the bottom located between the inscribed circle inscribed in the interposed member and the circumcircle circumscribing the interposed member in the planar direction. That is, the bottom is disposed at a portion, of the vibration plate, that is less likely to be vibrated. Consequently, the connection portion is connected to the portion, of the vibration plate, that is less likely to be vibrated. Therefore, transmission of vibration between the vibration plates through the connection portions can be further suppressed.

[4] The interposed member may be disposed such that a node of vibration of the vibration plate is located between the inscribed circle inscribed in the interposed member and the circumcircle circumscribing the interposed member in the planar direction.

In this configuration, the interposed member is less likely to hinder vibration of the vibration plate. Moreover, the connection portion is connected to the vicinity of the node of vibration of the vibration plate, and thus transmission of vibration between the vibration plates through the connection portions can be further suppressed.

[5] The connection portion may protrude in a thickness direction of the vibration plate beyond the vibration plate.

In this configuration, it is possible to lengthen the connection portion while suppressing expansion of the ultrasonic transducer in the planar direction orthogonal to the thickness direction of the vibration plate.

[6] Each of the vibration plate and the connection portion may have electrical conductivity. The ultrasonic transducer may further include a wiring portion connecting the vibration plate or the connection portion to an electrically-conductive path. The number of the wiring portions may be one or more and smaller than the number of the vibration plates.

In this configuration, all of the vibration plates connected by the connection portion can be electrically connected to the electrically-conductive path by the wiring portions, the number of which is smaller than that of the vibration plates.

Advantageous Effects of the Invention

According to the present invention, the relative positional relationship among the vibrators is easily stabilized.

MODES FOR CARRYING OUT THE INVENTION

First Embodiment

Figure 1:
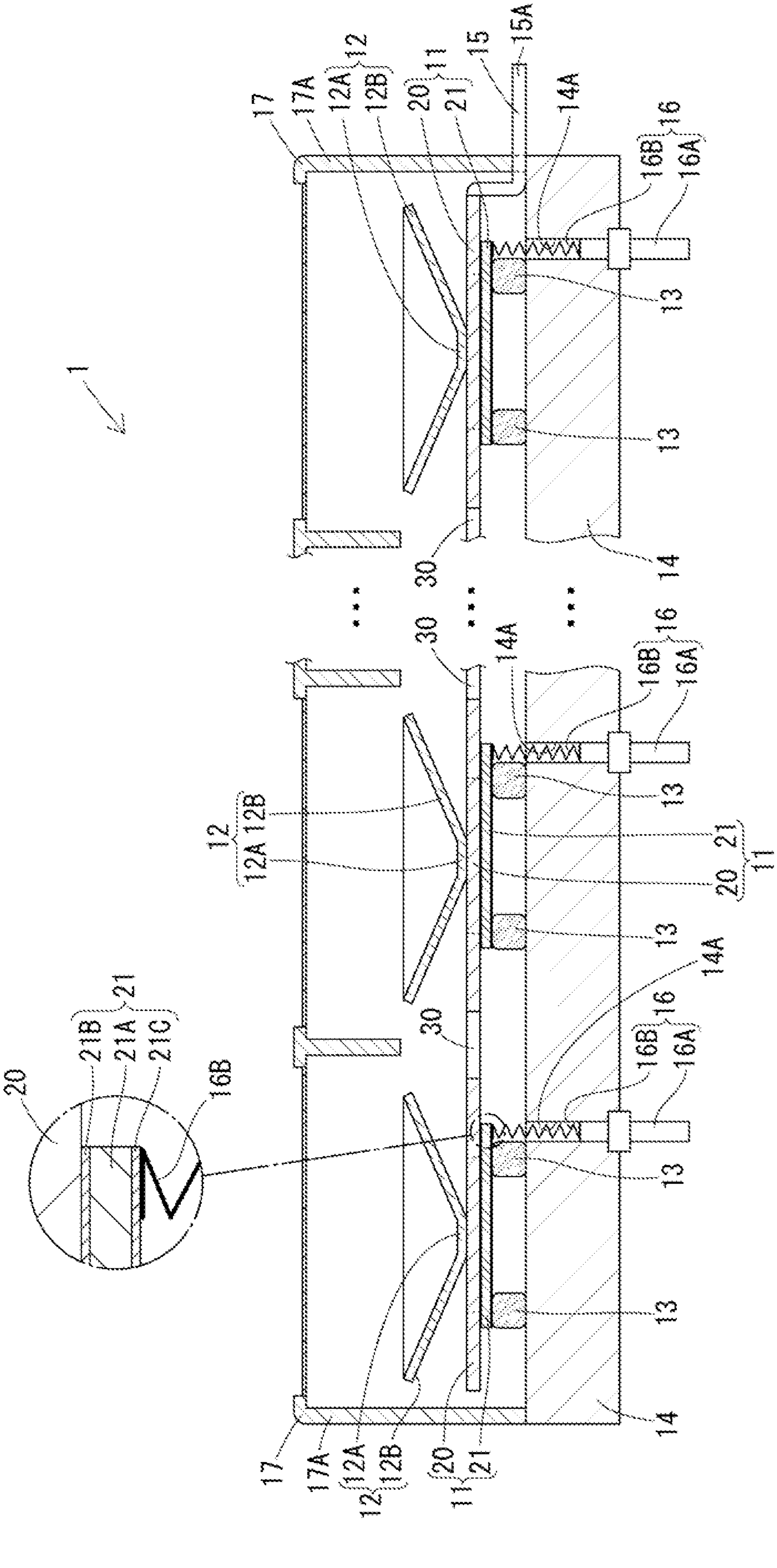
FIG. 1 is a cross-sectional view schematically showing an ultrasonic transducer in a first embodiment.

An ultrasonic transducer 1 shown in FIG. 1 is used for, for example, a medical or industrial ultrasonic device. The ultrasonic transducer 1 generates, upon receiving a drive signal, an ultrasonic wave and converts, upon receiving an ultrasonic wave, the ultrasonic wave into an electric signal.

The ultrasonic transducer 1 includes a plurality of vibrators 11, a plurality of resonators 12, a plurality of interposed members 13, a base portion 14, a wiring portion 15, a plurality of second wiring portions 16, and a case 17.

Each of the vibrators 11 has a vibration plate 20 and a piezoelectric element 21. The vibration plate 20 and the piezoelectric element 21 each have a plate shape, are disposed in such a positional relationship as to overlap with each other, and are joined to each other. In the present description, the term "joined" conceptually encompasses not only a configuration in which joining is directly performed but also a configuration in which joining is performed via another member.

The vibration plate 20 has electrical conductivity and is made of, for example, metal. The vibration plate 20 has a disc shape. A width (maximum width) W1 of the vibration plate 20 is larger than a width (maximum width) of each of the resonator 12, the interposed member 13, and the piezoelectric element 21. The width (maximum width) W1 of the vibration plate 20 refers to the length (maximum length) thereof in a direction orthogonal to a thickness direction of the vibration plate 20. In the present embodiment, the width (maximum width) W1 of the vibration plate 20 is the diameter of the outer circumference of the vibration plate 20.

The vibration plate 20 is vibrated so as to form an annular (more specifically, ring-shaped) node 22. The node 22 refers to a portion at which, when the vibration plate 20 is vibrated, the displacement amount thereof in the plate thickness direction is smallest or no vibration occurs. The node 22 is uniquely determined according to the shapes and the materials of the vibrator 11 and the resonator 12. The outer circumference of the vibration plate 20 is a free end. That is, the ultrasonic transducer 1 is of a so-called opened type and is more easily vibrated than an ultrasonic transducer of a closed type in which the outer circumference of the vibration plate 20 is fixed. The node 22 is formed inward of the outer circumference of the vibration plate 20 and outward of the center of the vibration plate 20, in a planar direction orthogonal to the plate thickness direction. Vibration of the vibration plate 20 become more intense from the node 22 toward the outer circumference and become more intense from the node 22 toward the center.

Each of the vibration plates 20 has, in the thickness direction thereof, a one-side surface to which a corresponding one of the resonators 12 is joined and an another-side surface to which the piezoelectric element 21 is joined.

The resonator 12 generates an ultrasonic wave in resonance with vibration of the vibration plate 20. The resonator 12 has a cone shape. The resonator 12 has a flat portion 12A and a tapered portion 12B. The flat portion 12A is flat and has a plate shape (more specifically, a disc shape). The flat portion 12A is joined to the one-side surface in the thickness direction of the vibration plate 20. The tapered portion 12B cylindrically extends from the outer circumference of the flat portion 12A to a side opposite to the vibration plate 20 side. The tapered portion 12B has a tapered shape such that the inner circumference thereof becomes wider toward the side opposite to the vibration plate 20 side.

The piezoelectric element 21 has a rectangular shape as seen in the thickness direction of the vibration plate 20. The piezoelectric element 21 has: a piezoelectric body 21A having a plate shape; and electrodes 21B and 21C provided on both sides in a thickness direction of the piezoelectric body 21A. The piezoelectric body 21A is formed from piezoelectric ceramic. The electrode 21B as one of the electrodes 21B and 21C provided on both sides of the piezoelectric element 21 is joined to the vibration plate 20 and electrically connected to the wiring portion 15 via the vibration plates 20. The electrode 21C as the other one of the electrodes 21B and 21C provided on both sides of the piezoelectric element 21 is electrically connected to a corresponding one of the second wiring portions 16. To a surface, of the piezoelectric element 21, on the side opposite to the vibration plate 20 side (i.e., a surface, of the vibrator 11, on a side opposite to the resonator 12 side), the base portion 14 is joined with a corresponding one of the interposed members 13 therebetween.

The interposed member 13 is disposed between the vibrator 11 (more specifically, the piezoelectric element 21) and the base portion 14 and is joined to the vibrator 11 (more specifically, the piezoelectric element 21) and the base portion 14. The interposed member 13 has insulating properties and elasticity. The interposed member 13 is formed from, for example, a rubber or a resin into which carbon black, calcium carbonate, or the like has been kneaded. The interposed member 13 has an annular shape (more specifically, a ring shape). An axial direction of the interposed member 13 extends along the thickness direction of the vibration plate 20, and more specifically, coincides with the thickness direction of the vibration plate 20. The interposed member 13 is disposed such that the node 22 of vibration of the vibration plate 20 is located between an inscribed circle 13A inscribed in the interposed member 13 and a circumcircle 13B circumscribing the interposed member 13 in the planar direction orthogonal to the plate thickness direction of the vibration plate 20 (see FIG. 3).

The base portion 14 is formed from a synthetic resin and is formed as a resin base. The base portion 14 has a plate shape. A thickness direction of the base portion 14 extends along the thickness direction of the vibration plate 20, and more specifically, coincides with the thickness direction of the vibration plate 20. The plurality of vibrators 11 is joined to a one-side surface in the thickness direction of the base portion 14. The vibrators 11 are disposed along the planar direction orthogonal to the thickness direction.

The wiring portion 15 has a terminal 15A made of metal. The wiring portion 15 is electrically connected to the vibration plate 20. In addition, the wiring portion 15 is electrically connected to one of electrically-conductive paths out of a positive-electrode-side electrically-conductive path and a negative-electrode-side electrically-conductive path (for example, a ground). That is, the wiring portion 15 electrically connects the vibration plate 20 to the one electrically-conductive path.

The second wiring portion 16 has a terminal 16A and a coil spring 16B each made of metal. The base portion 14 has base through-holes 14A formed so as to penetrate therethrough in the thickness direction. Each of the second wiring portions 16 is inserted through a corresponding one of the base through-holes 14A. The terminal 16A is fixed to the base portion 14 at a position where the terminal 16A closes an opening, of the base through-hole 14A, on the side opposite to the vibration plate 20 side. An expansion/contraction direction of the coil spring 16B extends along the thickness direction of the vibration plate 20, and more specifically, coincides with the thickness direction. The coil spring 16B is sandwiched between the piezoelectric element 21 and the terminal 16A and is disposed in a state of being compressed by being pressed by the piezoelectric element 21 and the terminal 16A. The coil spring 16B has one end in contact with a surface, of the piezoelectric element 21, on the side opposite to the vibration plate 20 side (i.e., the electrode 21C of the piezoelectric element 21), and has another end in contact with the terminal 16A. The second wiring portion 16 is electrically connected to the other of the electrically-conductive paths out of the positive-electrode-side electrically-conductive path and the negative-electrode-side electrically-conductive path (for example, the ground).

The case 17 is a member for protecting the vibrator 11 and the resonator 12 so as not to allow foreign matter to come into contact with the vibrator 11 and the resonator 12. The case 17 is fixed to the base portion 14. The case 17 has a circumferential wall portion 17A enclosing the surrounding of the vibrators 11 and the resonators 12. A plurality of openings is formed on a side opposite to the base portion 14 side relative to the resonators 12 in the case 17. Through the openings, ultrasonic waves are transmitted to outside and come into the case 17 from outside.

Figure 2:
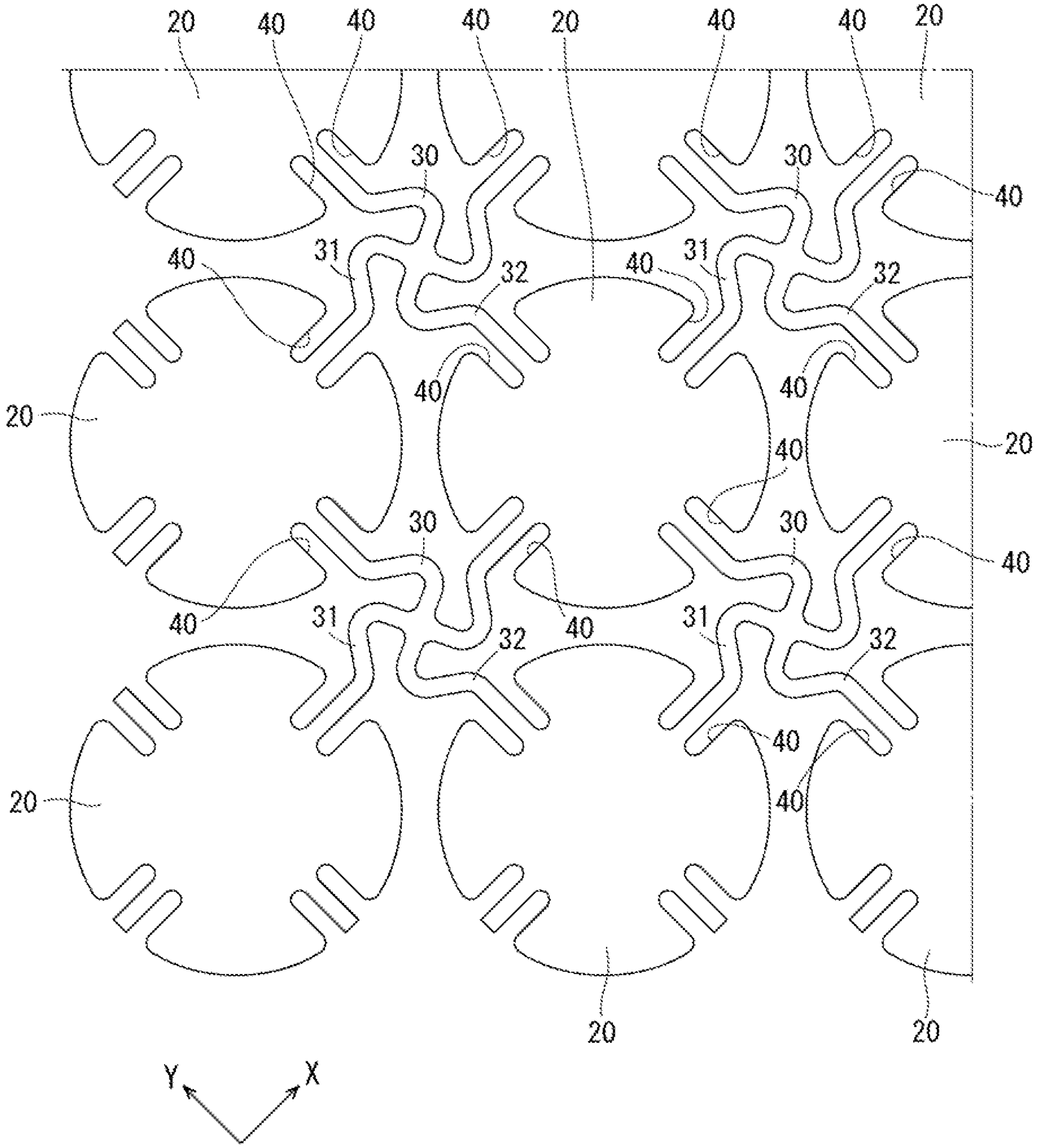
FIG. 2 is a plan view of a state where multiple vibration plates are connected by connection portions.

The ultrasonic transducer 1 includes connection portions 30 as shown in FIG. 1 and FIG. 2. The connection portions 30 connect the vibrators 11 to each other. More specifically, the connection portions 30 connect the vibration plates 20 to each other. Each of the connection portions 30 has electrical conductivity and is made of, for example, metal. A width W2 of the connection portion 30 is smaller than the width (maximum width) W1 of the vibration plate 20. The connection portion 30 and the vibration plate 20 have the same thickness. Both surfaces in a thickness direction of the connection portion 30 are flat and flush with both surfaces in the thickness direction of the vibration plate 20. The connection portion 30 is integrally formed of the same member as the vibration plate 20. The vibration plate 20 and the connection portion 30 are formed by, for example, punching a metal plate. In a case where the connection portion 30 does not have a constant width, the width W2 of the connection portion 30 refers to the largest width of the connection portion 30.

As shown in FIG. 2, the vibration plate 20 has a cut portion 40 formed by cutting the vibration plate 20 from an outer circumferential edge thereof to an inner side thereof. A plurality of (in the present embodiment, four) cut portions 40 are arranged along the circumferential direction of the vibration plate 20. Each of the connection portions 30 is connected to the inner surface of a corresponding one of the cut portions 40.

As shown in FIG. 2, the vibration plates 20 are disposed side by side along the planar direction orthogonal to the thickness direction. In the planar direction orthogonal to the thickness direction of the vibration plate 20, there are an X direction and a Y direction intersecting with (in the present embodiment, orthogonal to) each other. The vibration plates 20 are disposed side by side along the X direction and the Y direction. The cut portions 40 are formed on both sides in the X direction and both sides in the Y direction of each of the vibration plates 20. Each of the connection portions 30 has: a first connection portion 31 connecting corresponding vibration plates 20 disposed side by side in the X direction to each other; and a second connection portion 32 connecting corresponding vibration plates 20 disposed side by side in the Y direction to each other. The first connection portion 31 and the second connection portion 32 are connected while intersecting with each other. The connection portion 30 has bent portions as seen in the thickness direction of the vibration plate 20. More specifically, as shown in FIG. 3, the connection portion 30 has: a linear portion 30A linearly extending from an inner surface of a corresponding one of the cut portions 40; and a bent portion 30B extending from an end of the linear portion 30A on a side opposite to the cut portion 40 side so as to be bent.

Figure 3:
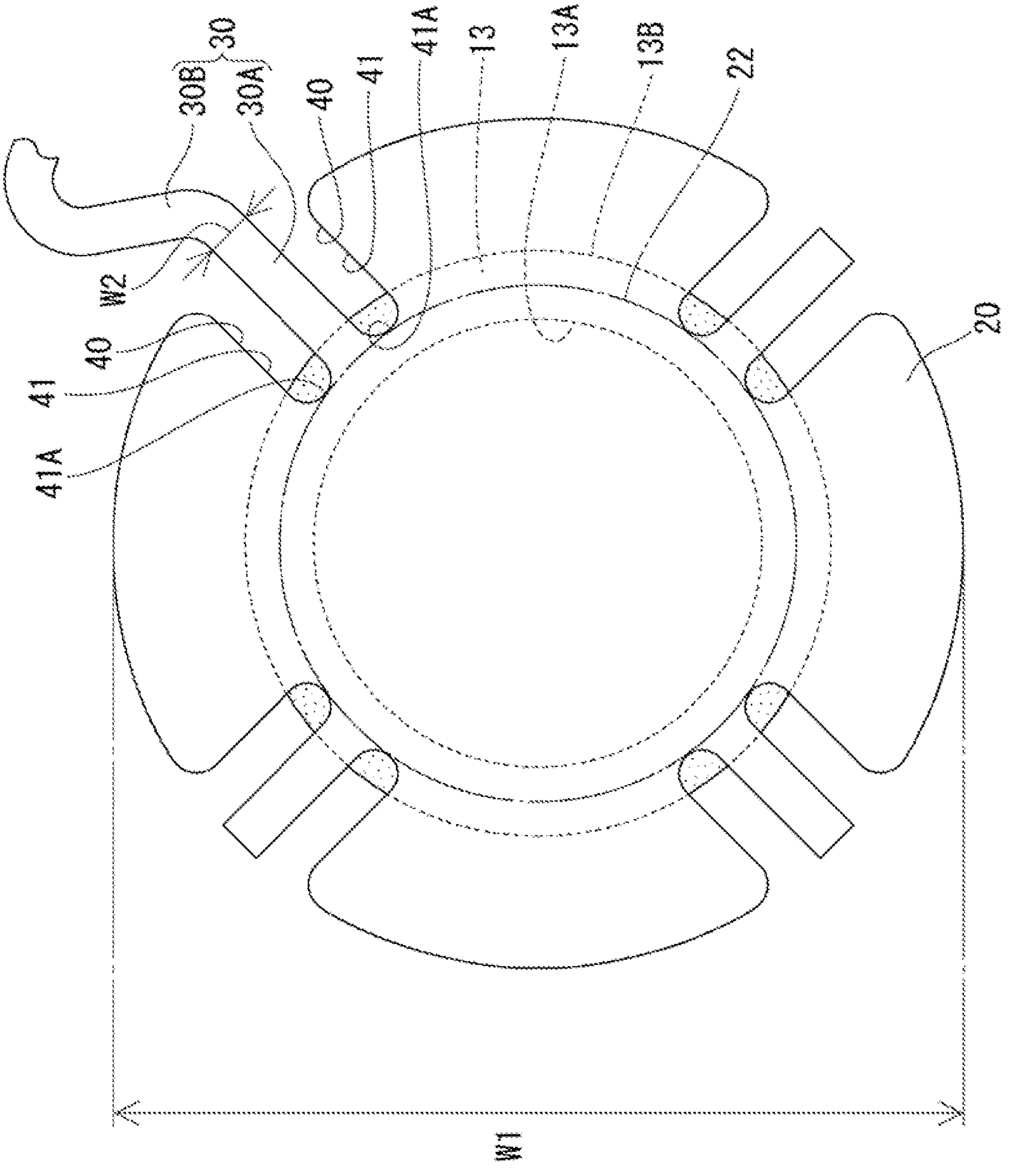
FIG. 3 is an enlarged view of a vibration plate and a connection portion.

As shown in FIG. 3, recessed portions 41 are formed between the connection portion 30 and the inner surface of the cut portion 40. Each of the recessed portions 41 has a bottom 41A located between the inscribed circle 13A inscribed in the interposed member 13 and the circumcircle 13B circumscribing the interposed member 13 in the planar direction orthogonal to the thickness direction of the vibration plate 20. The bottom 41A of the recessed portion 41 refers to a position, of the recessed portion 41, closest to a center of the vibration plate 20 in the planar direction. The center of the vibration plate 20 refers to the center of a circumcircle circumscribing the vibration plate 20.

As shown in FIG. 1, the multiple vibration plates 20 are electrically connected via the connection portions 30. The wiring portion 15 is joined to one (a single) vibration plate 20 among the plurality of vibration plates 20. The wiring portion 15 is electrically connected to one of the electrically-conductive paths out of the positive-electrode-side electrically-conductive path and the negative-electrode-side electrically-conductive path (for example, the ground). That is, the plurality of vibration plates 20 is electrically connected to the one electrically-conductive path via the single wiring portion 15.

The following descriptions are related to advantageous effects of the first embodiment.

In the ultrasonic transducer 1 in the first embodiment, the vibrators 11 are connected to each other by the connection portions 30, and thus the relative positional relationship among the vibrators 11 is easily stabilized. Moreover, the vibrators 11 are connected to each other by connecting the vibration plates 20 as parts of the vibrators 11, and the width of the connection portion 30 connecting the vibration plates 20 to each other is smaller than the width of the vibration plate 20. Consequently, transmission of vibration between the vibration plates 20 through the connection portions 30 can be suppressed.

In addition, when the vibration plate 20 is vibrated, the annular node 22 is formed on the vibration plate 20, and vibration become more intense from the node 22 toward the outer circumferential side. Thus, if the connection portion 30 is connected to the outer circumferential edge of the vibration plate 20, intense vibration at the outer circumferential edge is transmitted to the connection portion 30. Meanwhile, in the above configuration, the connection portion 30 is connected to a part of the inner surface of the cut portion 40 formed by cutting the vibration plate 20 from the outer circumferential edge thereof to the inner side thereof, and the recessed portion 41 opened to the outer circumferential side of the vibration plate 20 is formed between the connection portion 30 and the inner surface of the cut portion 40. Consequently, direct transmission of intense vibration at the outer circumferential edge to the connection portion 30 can be avoided. Therefore, transmission of vibration between the vibration plates 20 through the connection portions 30 can be further suppressed.

Further, each of the vibrators 11 is joined to the base portion 14 with the corresponding interposed member 13 therebetween, and therefore, a portion to which the interposed member 13 is joined is less likely to be vibrated. In the above configuration, the recessed portion 41 has the bottom 41A located between the inscribed circle 13A inscribed in the interposed member 13 and the circumcircle 13B circumscribing the interposed member 13 in the planar direction. That is, the bottom 41A is located at a portion, of the vibration plate 20, that is less likely to be vibrated. Consequently, the connection portion 30 is connected to the portion, of the vibration plate 20, that is less likely to be vibrated. Therefore, transmission of vibration between the vibration plates 20 through the connection portions 30 can be further suppressed.

Further, the interposed member 13 is disposed such that the node 22 of vibration of the vibration plate 20 is located between the inscribed circle 13A inscribed in the interposed member 13 and the circumcircle 13B circumscribing the interposed member 13 in the planar direction orthogonal to the thickness direction of the vibration plate 20. Consequently, the interposed member 13 is less likely to hinder vibration of the vibration plate 20. Moreover, the connection portion 30 is connected to the vicinity of the node 22 of vibration of the vibration plate 20, and thus transmission of vibration between the vibration plates 20 through the connection portions 30 can be further suppressed.

Furthermore, each of the vibration plate 20 and the connection portion 30 has electrical conductivity, and the wiring portion 15 connects the vibration plate 20 to the electrically-conductive path. In addition, the number of the wiring portions 15 is one and smaller than the number of the vibration plates 20. Consequently, all of the vibration plates 20 connected by the connection portions 30 can be electrically connected to the electrically-conductive path by the wiring portions 15, the number of which is smaller than that of the vibration plates 20.

Second Embodiment

An ultrasonic transducer 201 in a second embodiment is different from the ultrasonic transducer 1 in the first embodiment in that connection portions 230 protrude in the thickness direction beyond the vibration plates 20, but is in common with that of the first embodiment in other features. In the following descriptions, the same components as those in the first embodiment are denoted by the same reference characters, and detailed explanations thereof are omitted.

Figure 4:
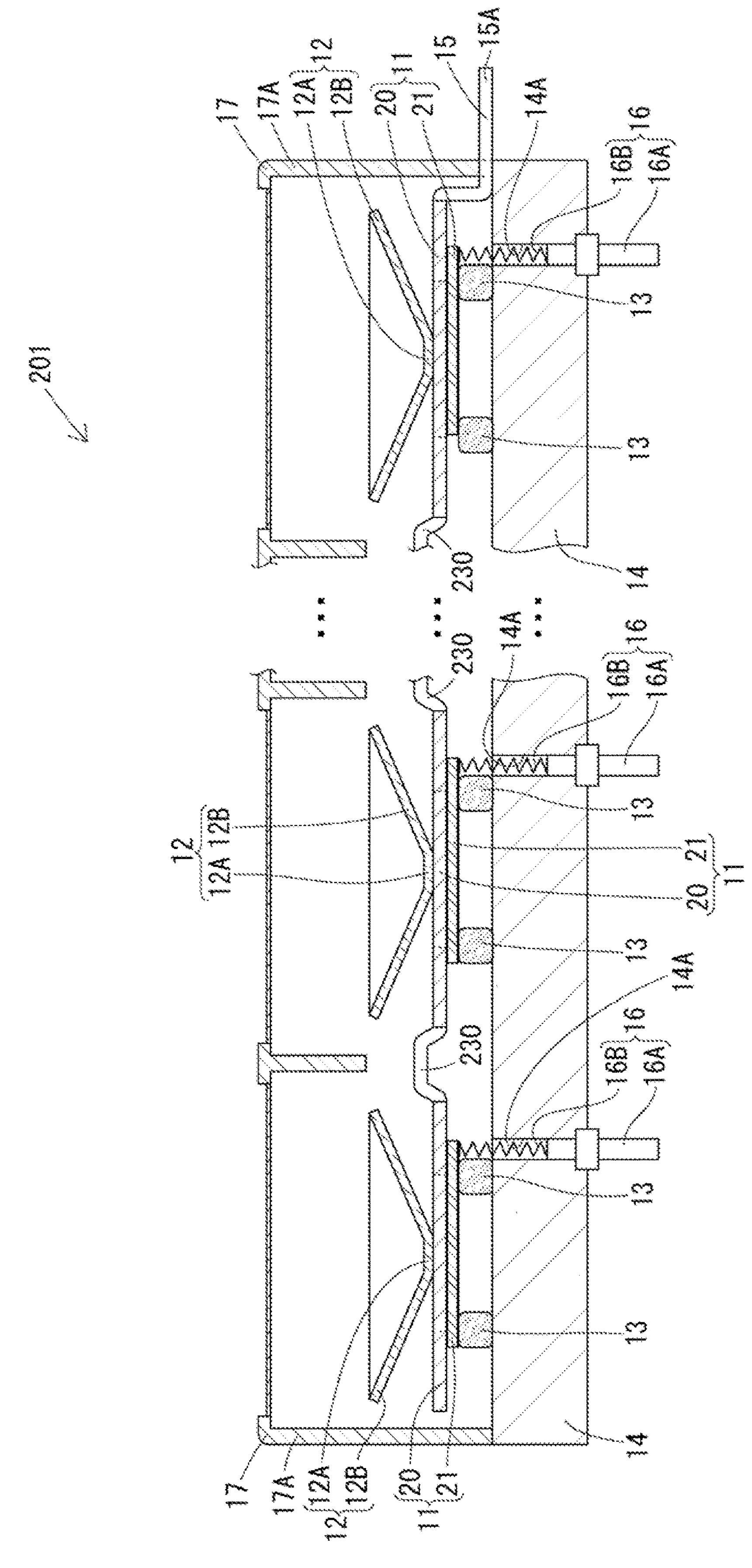
FIG. 4 is a cross-sectional view schematically showing an ultrasonic transducer in a second embodiment.

As shown in FIG. 4, the ultrasonic transducer 201 in the second embodiment includes the connection portions 230. The connection portions 230 protrude, beyond the vibration plates 20, in a direction away from the base portion 14. In this configuration, it is possible to lengthen the connection portions 230 while suppressing expansion of the ultrasonic transducer 201 in the planar direction orthogonal to the thickness direction of the vibration plates 20.

Third Embodiment

An ultrasonic transducer 301 in a third embodiment includes connection portions 330 protruding in a direction that is opposite to the direction in which the connection portions 230 of the ultrasonic transducer 201 in the second embodiment protrude. In the following descriptions, the same components as those in the first embodiment are denoted by the same reference characters, and detailed explanations thereof are omitted.

Figure 5:
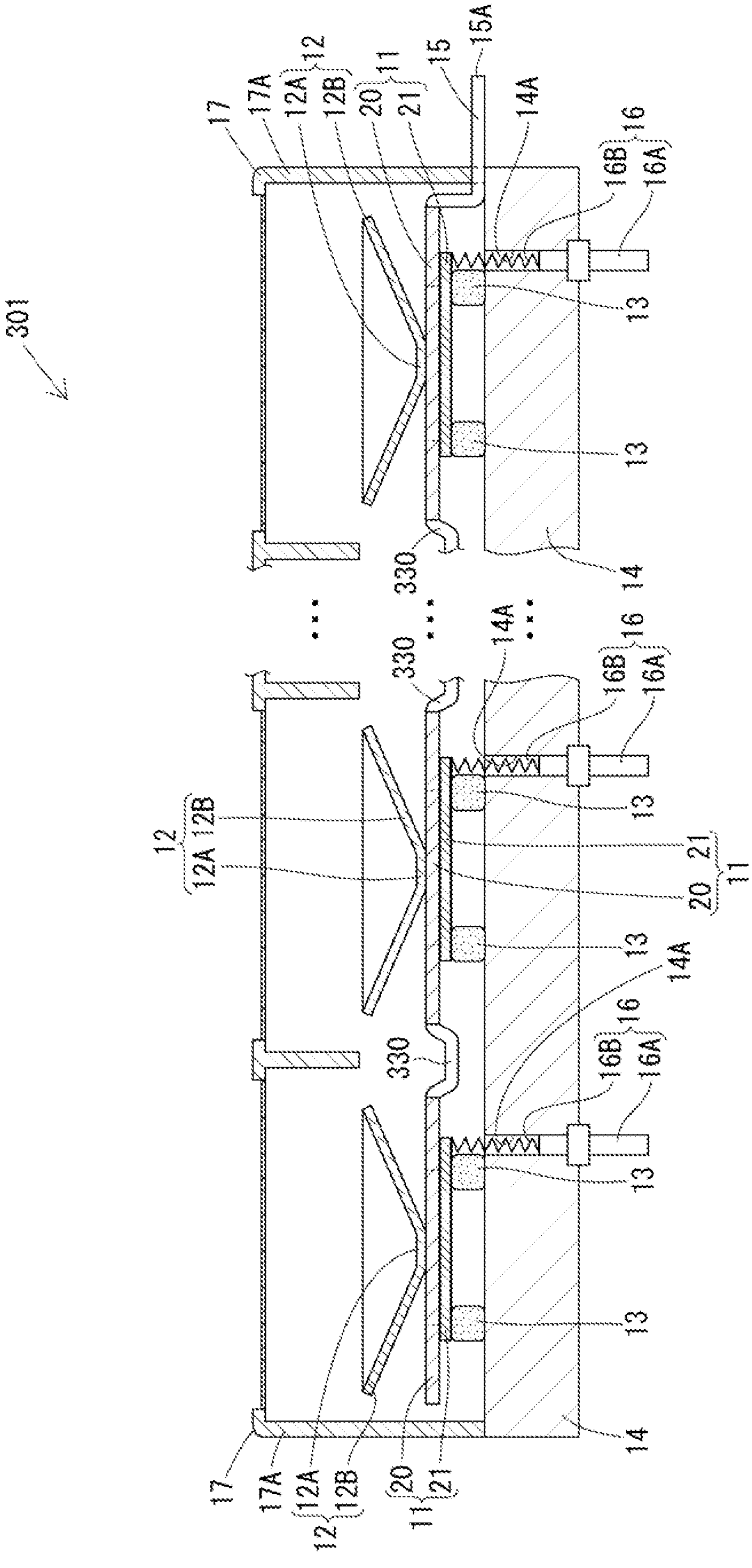
FIG. 5 is a cross-sectional view schematically showing an ultrasonic transducer in a third embodiment.

As shown in FIG. 5, the ultrasonic transducer 301 in the third embodiment includes the connection portions 330. The connection portions 330 protrude, beyond the vibration plates 20, in a direction toward the base portion 14. In this configuration, it is possible to lengthen the connection portions 330 while suppressing expansion of the ultrasonic transducer 301 in the planar direction orthogonal to the thickness direction of the vibration plates 20.

Fourth Embodiment

Although the vibration plate 20 has the cut portions 40 in the ultrasonic transducer 1 in the first embodiment, the vibration plate 20 may have no cut portion 40. In addition, although the connection portion 30 in the ultrasonic transducer 1 in the first embodiment has bent portions as seen in the thickness direction of the vibration plates 20, the connection portion 30 may have no bent portion. In the fourth embodiment, an example of the configuration in which no cut portion 40 is provided and the connection portion has no bent portion, will be described.

Figure 6:
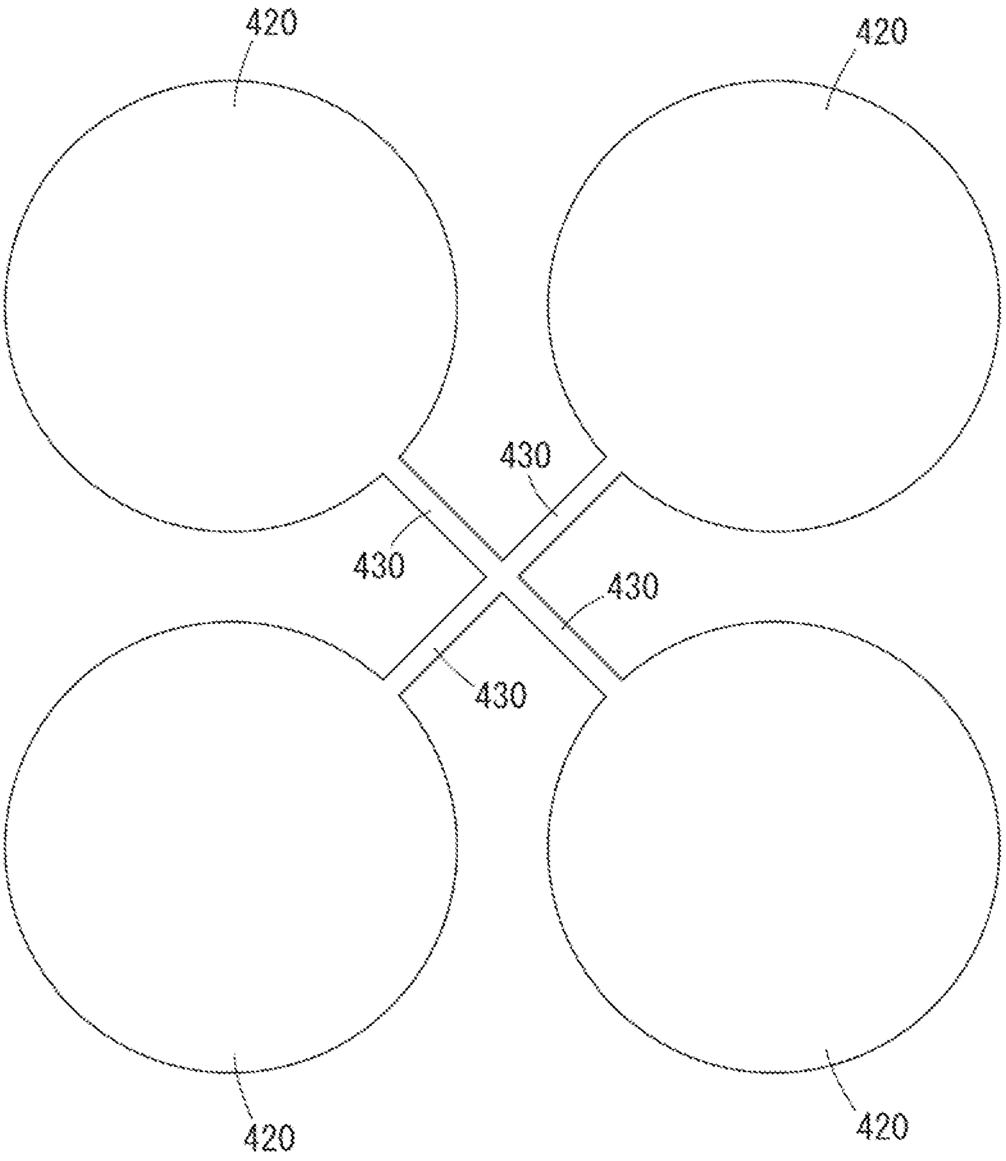
FIG. 6 is a plan view of a state where multiple vibration plates are connected by connection portions, in a fourth embodiment.

In the fourth embodiment, as shown in FIG. 6, vibration plates 420 have no cut portions 40. In addition, connection portions 430 have linear shapes as seen in the thickness direction of the vibration plates 420. In this configuration, the vibration plates 420 and the connection portions 430 have simple shapes, and thus it is easy to manufacture a mold for forming the vibration plates 420 and the connection portions 430.

Other Embodiments

The present invention is not limited to the embodiments explained by means of the above descriptions and drawings, and, for example, embodiments described below are also encompassed in the technical scope of the present invention. In addition, various features in the above embodiments and the embodiments described later may be combined in any way as long as the combination does not lead to any contradiction.

Although the vibration plates and the connection portions in the above embodiments have electrical conductivity, the vibration plates and the connection portions may have insulating properties.

Although the connection portions in the above embodiments are formed of the same members as the vibration plates, the connection portions may be formed of members different from the vibration plates.

The embodiments disclosed herein are merely illustrative in all aspects and should not be recognized as being restrictive. The scope of the present invention is not limited by the embodiments disclosed herein and is intended to encompass the scope defined by the claims and all modifications made within the scope equivalent to the scope of the claims.

DESCRIPTION OF REFERENCE NUMERALS

1: ultrasonic transducer
11: vibrator
12: resonator
13: interposed member
13A: inscribed circle
13B: circumcircle
14: base portion
15: wiring portion
20: vibration plate
21: piezoelectric element
21A: piezoelectric body
21B: electrode
21C: electrode
22: node
30: connection portion
40: cut portion
41: recessed portion
41A: bottom of recessed portion
201: ultrasonic transducer
230: connection portion
301: ultrasonic transducer
330: connection portion
420: vibration plate
430: connection portion
W1: width of vibration plate
W2: width of connection portion

The invention claimed is:

1. An ultrasonic transducer comprising:
a plurality of vibrators; and
a connection portion connecting the vibrators to each other, wherein
each of the vibrators has a piezoelectric element and a vibration plate joined to the piezoelectric element,
the connection portion connects the vibration plates to each other,
a width W2 of the connection portion is smaller than a width W1 of the vibration plate,
the width W1 of the vibration plate refers to a maximum length thereof in a direction orthogonal to a thickness direction of the vibration plate, and
the width W2 of the connection portion refers to a largest width of the connection portion thereof in a direction orthogonal to a thickness direction of the connection portion.

2. The ultrasonic transducer according to claim 1, wherein
the vibration plate has a cut portion formed by cutting the vibration plate from an outer circumferential edge thereof to an inner side thereof,
the connection portion is connected to a part of an inner surface of the cut portion, and
a recessed portion opened to an outer circumferential side of the vibration plate is formed between the connection portion and the inner surface of the cut portion.

3. The ultrasonic transducer according to claim 2, further comprising:
a base portion; and
a plurality of interposed members, wherein
each of the interposed members has an annular shape, is disposed between a corresponding one of the vibrators and the base portion, and is joined to the vibrator and the base portion, and
the recessed portion has a bottom located between an inscribed circle inscribed in the interposed member and a circumcircle circumscribing the interposed member in a planar direction orthogonal to a thickness direction of the vibration plate.

4. The ultrasonic transducer according to claim 3, wherein the interposed member is disposed such that a node of vibration of the vibration plate is located between the inscribed circle and the circumcircle in the planar direction.

5. The ultrasonic transducer according to claim 1, wherein the connection portion protrudes in a thickness direction of the vibration plate beyond the vibration plate.

6. The ultrasonic transducer according to claim 1, wherein
each of the vibration plate and the connection portion has electrical conductivity,
the ultrasonic transducer further comprises a wiring portion connecting the vibration plate or the connection portion to an electrically-conductive path, and
the number of the wiring portions is one or more and smaller than the number of the vibration plates.

7. An ultrasonic transducer comprising:
a plurality of vibrators; and
a connection portion connecting the vibrators to each other, wherein
each of the vibrators has a piezoelectric element and a vibration plate joined to the piezoelectric element,
the connection portion connects the vibration plates to each other,
a width of the connection portion is smaller than a width of the vibration plate,
the vibration plate has a cut portion formed by cutting the vibration plate from an outer circumferential edge thereof to an inner side thereof,
the connection portion is connected to a part of an inner surface of the cut portion, and
a recessed portion opened to an outer circumferential side of the vibration plate is formed between the connection portion and the inner surface of the cut portion.

8. The ultrasonic transducer according to claim 7, further comprising:
a base portion; and
a plurality of interposed members, wherein
each of the interposed members has an annular shape, is disposed between a corresponding one of the vibrators and the base portion, and is joined to the vibrator and the base portion, and
the recessed portion has a bottom located between an inscribed circle inscribed in the interposed member and a circumcircle circumscribing the interposed member in a planar direction orthogonal to a thickness direction of the vibration plate.

9. The ultrasonic transducer according to claim 8, wherein the interposed member is disposed such that a node of vibration of the vibration plate is located between the inscribed circle and the circumcircle in the planar direction.

10. The ultrasonic transducer according to claim 7, wherein the connection portion protrudes in a thickness direction of the vibration plate beyond the vibration plate.

11. The ultrasonic transducer according to claim 7, wherein each of the vibration plate and the connection portion has electrical conductivity, the ultrasonic transducer further comprises a wiring portion connecting the vibration plate or the connection portion to an electrically-conductive path, and the number of the wiring portions is one or more and smaller than the number of the vibration plates.

* * * * *